United States Patent [19]

Okada et al.

[11] 3,905,440
[45] Sept. 16, 1975

[54] CONTROL DEVICE FOR EMERGENCY LOCK TYPE VEHICLE SAFETY BELT

[75] Inventors: Motohiro Okada, Tokyo; Taiji Omori, Kawagoe, both of Japan

[73] Assignee: Honda Giken Kogyo Kabushiki Kaisha, Tokyo, Japan

[22] Filed: Apr. 9, 1974

[21] Appl. No.: 459,366

[30] Foreign Application Priority Data
Apr. 10, 1973  Japan............................... 48-40552

[52] U.S. Cl.......... 180/82 C; 307/10 SB; 317/11 A; 340/52 E
[51] Int. Cl.²........................................ B60R 21/00
[58] Field of Search............ 180/82 C; 280/150 SB; 307/10 SB, 136; 340/52 E; 317/11 A

[56] References Cited
UNITED STATES PATENTS

| | | | |
|---|---|---|---|
| 3,168,158 | 2/1965 | Schoeffler | 180/82 C |
| 3,330,992 | 7/1967 | Perrins | 317/11 A |
| 3,736,466 | 5/1973 | Fox | 317/11 A |
| 3,797,603 | 3/1974 | Loomba | 180/82 C |
| 3,807,522 | 4/1974 | Becker | 180/82 C |

Primary Examiner—Leo Friaglia
Assistant Examiner—R. Schrecengost
Attorney, Agent, or Firm—Haseltine, Lake & Waters

[57] ABSTRACT

A belt lock control including a mechanical and an electrical G-sensor switch both connected in series with solenoid means for locking the belt retractor, the electrical G-sensor switch being arranged to operate in advance of the mechanical G-sensor switch. The control is substantially free from any arcing at the switch contacts, requires no unusually large G-sensor weight, and is highly reliable.

14 Claims, 9 Drawing Figures

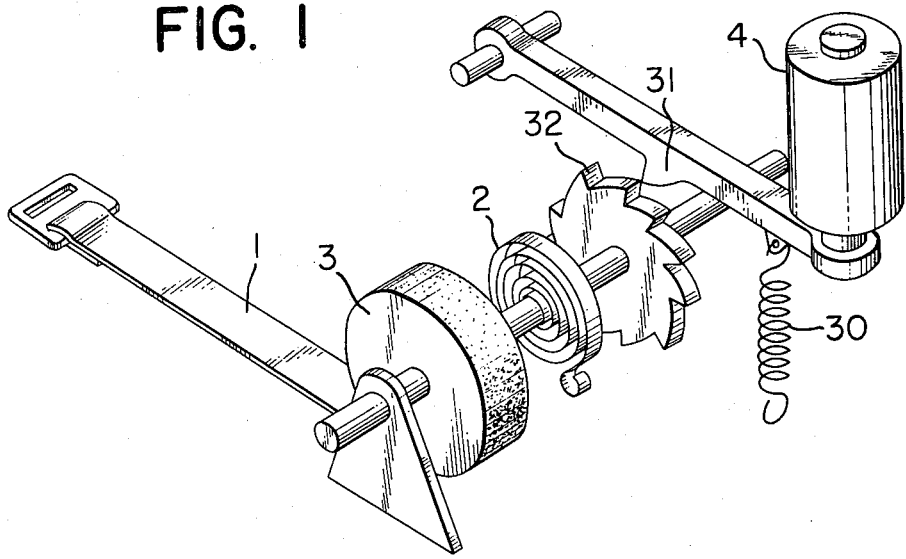
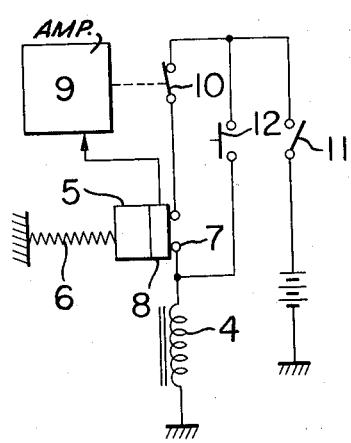
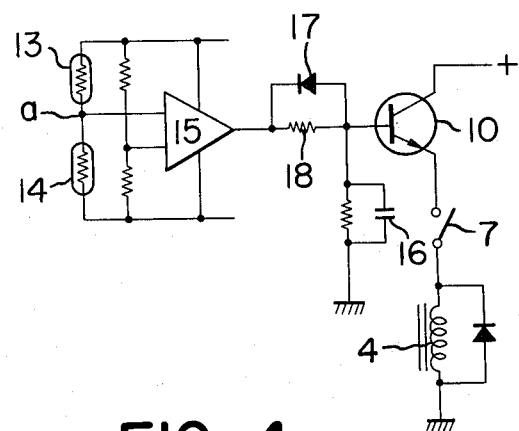
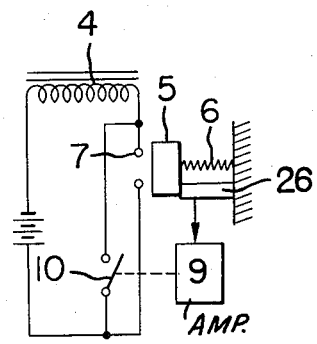

CONTROL DEVICE FOR EMERGENCY LOCK TYPE VEHICLE SAFETY BELT

FIELD OF THE INVENTION

This invention relates generally to vehicle safety belts and more particularly to safety belts of the so-called emergency lock or inertia reel type including a belt retractor or reel adapted to turn freely under a limited tension of the safety seat belt and to be locked instantaneously under a harsh shock occurring in the event of sudden stoppage of the vehicle such as, for instance, occurs in a collision, the retractor or reel operating to hold the belt against any further extension.

BACKGROUND OF THE INVENTION

There are two types (e.g., electromagnetic and mechanical) of reel locks used with vehicle safety belts of the type described. The electromagnetic type of reel lock generally operates more rapidly than the mechanical type and has a satisfactory life-saving capacity as it locks the reel before the driver or passenger has started to move forward relative to the associated car body during a collision of a vehicle.

On the other hand, however, the electromagnetic reel lock has various disadvantages as follows:

1. In general, belt reel locks are set to operate at an acceleration of the order of 0.5 G so that they may work even under a shock of such an intensity as caused by sudden brake engagement and a shock of like intensity which may occur frequently during travel at high speed or over an irregular road surface. This means that the contacts of the G-sensor switch, associated with a DC solenoid load, are frequently caused to make and break and can be heavily damaged by arcing.

2. To cope with such difficulty, the use might be contemplated of a large-capacity switch. Such switch, however, requires a correspondingly large force for its operation and an inordinately large G-sensor weight is needed in order to obtain a sensitivity of the order of 0.5G.

3. Arcing at the switch contacts can be prevented by connecting a capacitor in parallel therewith. In this case, however, the capacitor may possibly be short-circuited and thus result in a situation in which the belt reel is left unlocked.

4. The difficulty stated in (3) can be overcome by the use of a mercury switch but it is practically impossible to design such a switch adapted to respond in the required time of operation.

5. Use of a non-contact switch as a G-sensor switch is advantageous in that it has no arcing problem and can be designed to operate rapidly as required. It involves, however, the danger that the reel lock may become inoperative in case of the failure of any of the switch components. Further, it is difficult to reduce the probability of such lock failure below an acceptable level particularly when not only the final output circuit but also the preceding circuit is taken into account.

SUMMARY OF THE INVENTION

The present invention is intended to overcome all the difficulties described above and provides a control device for an emergency lock type vehicle safety belt which comprises a belt retractor, an electromagnetic coil operable in an emergency to lock said belt retractor, a first, mechanical G-sensor switch and a second, electrical G-sensor switch both connected in series or in parallel with the electromagnetic coil, said second G-sensor switch being arranged to operate in advance of the first G-sensor switch.

The above and other objects, features and advantages of the present invention will become apparent from the following description when taken in conjunction with the accompanying drawings.

BRIEF DESCRIPTION OF THE DRAWINGS

In the drawing:

FIG. 1 is a perspective view illustrating the principles of the electromagnetically lockable belt retractor commonly used with a vehicle safety belt of the type described;

FIG. 2 is an electric circuit diagram of one preferred embodiment of the present invention;

FIG. 3 illustrates one example of amplifier circuit usable in the circuit of FIG. 2;

FIGS. 4 and 5 are circuit diagrams of respective embodiments of the present invention, both of the on-lock type;

DESCRIPTION OF THE PREFERRED EMBODIMENTS

Figure 5:
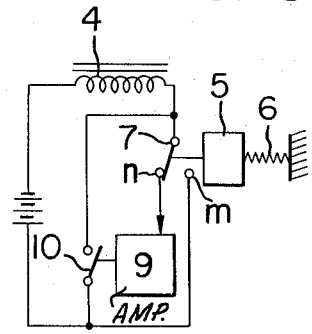

Diagrammatically illustrated in FIG. 1 is an electromagnetic emergency lock type belt retractor which employs a normally closed, second G sensor switch. As will be readily observed, the vehicle safety belt 1 can normally be extended under tension freely from the reel 3 against the bias of the retractor spring 2. In the event of an emergency stopping of the vehicle, as for example in an accident, the current supply to the electromagnetic coil 4 is interrupted so that the lock pawl 31 is brought into engagement with the ratchet 32 to hold the belt 1 against extension.

It will be obvious that arrangement of the electromagnetic coil 4 and spring 30 is reversed in case a normally open, second G-sensor switch is employed.

In FIG. 2 which illustrates one preferred embodiment of the present invention, component 4 is an off-lock type of electromagnetic coil operable when de-energized to lock the belt reel; component 5 is a G-sensor weight normally closing sensor contacts 7 under the bias of a spring 6; component 8 is a load cell serving the purpose of measuring the pressure of contact of the switch contacts 7; component 9 is an amplifier circuit operable to open a non-contact switch 10 only when the contact pressure of switch contacts 7 is below a predetermined value; and component 11 is a main-switch connected in the engine ignition circuit. Element 12 is a pushbutton switch provided to enable manual extension of the seat belt 1.

One example of details for the amplifier circuit 9 is illustrated in FIG. 3, in which component 13 is a resistancewire strain gauge arranged to detect the load of load cell 8, and component 14 is a dummy load for temperature compensation. An operational amplifier 15 has one of its input terminals connected to the junction $a$ between the strain gauge wire 13 and dummy load 14. Components 16 and 18 together form a delay circuit serving to prevent chattering of the pawl 31 shown in FIG. 1. A diode 17 is arranged to render the delay circuit inoperative for the high speed operation required of the non-contact or electronic switch 10 when it is turned off.

Assuming that, in a collision or accident, the G-sensor weight 5 is inertially driven to the left, as viewed in FIG. 2, the contact pressure of switch contacts 7 is reduced to decrease the resistance value of the load-detecting strain gauge 13 and the input voltage being applied to the operational amplifier 15 through the junction a is accordingly raised to become positive relative to the reference voltage being fed to the other input terminal. As the consequence, the output of the operational amplifier 15 is saturated in the negative sense and the non-contact switch 10 is turned off to de-energize the electromagnetic coil 4 so that the pawl 31 is brought into engagement with the ratchet 32 thereby to lock the safety belt 1.

The switch contacts 7 are subsequently opened as the sensor weight 5 is further accelerated but no arcing tending to hurt the contacts 7 occurs since only a small amount of current from the non-contact switch 10 is flowing through the contacts at the instant they are opened. With this arrangement, it is to be noted that, even if the non-contact switch 10 gets out of order and remains held in "on" condition, belt locking is safely effected in case of an emergency by the opening of contacts 7.

In case the device is used continuously with the above-described failure in the non-contact switch 10 unnoticed and the contacts 7 deteriorate and become unable to make good contact, or in case the non-contact switch 10 gets out of order and remains "off," the device assumes a state like that of an automatic lock type belt retractor whenever such trouble occurs during use of the device and its life-saving capacity remains unchanged through the driver's comfort may be more or less impaired. On the other hand, if such trouble arises while the vehicle is left parked, the driver will certainly become aware of the trouble before starting the vehicle as he cannot in such case pull out the safety belt for use thereof. In this event, however, he can use the belt for a while without repair as the belt lock can be released by the closing of push-button switch 12.

FIG. 4 illustrates an off-lock type device including an electromagnetic coil 4 operable when energized to lock the safety belt. In this device, the non-contact switch 10 is turned on when the bearing pressure of the G-sensor weight 5 against its seat 26 is reduced.

FIG. 5 illustrates another form of on-lock type device including a mechanical G-sensor switch 7 normally thrown in contact with the left-hand side contact n. As the sensor weight 5 is driven to the right, the non-contact switch 10 is turned on before the switch 7 is fully transferred into engagement with contact m.

Figure 6:
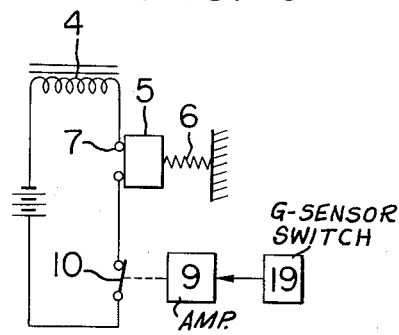
FIGS. 6 and 7 illustrate respective embodiments of the off-lock type.

FIG. 6 illustrates another form of off-lock type device, which includes a mechanical G-sensor switch 7 and another G-sensor switch 19 set to operate at an acceleration smaller than the setting of the former. The non-contact switch 10 operates under the signal output from the switch 19.

Figure 7:
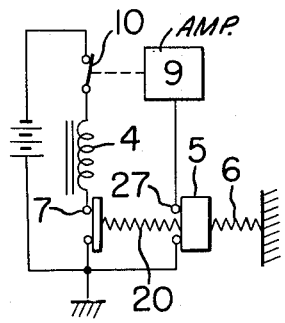

FIG. 7 illustrates a further form of off-lock type device, which is so arranged that, when the sensor weight 5 is moved to the right in a collision of the vehicle the contacts 27 are opened first to open the non-contact switch 10 through the medium of an amplifier circuit 9 and then the contacts 7 are opened as the weight 5 is further moved to release the compression of spring 20. An example of details for an amplifier circuit 9 usable in this form of device is shown in FIG. 8.

Figure 8:
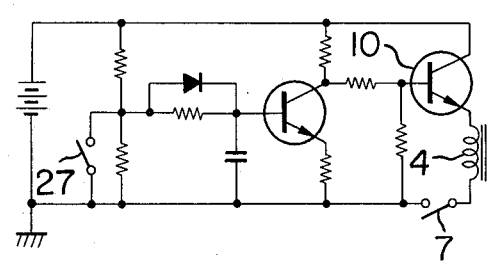
FIG. 8 illustrates one example of amplifier circuit usable in the circuit of FIG. 7.
Figure 9:
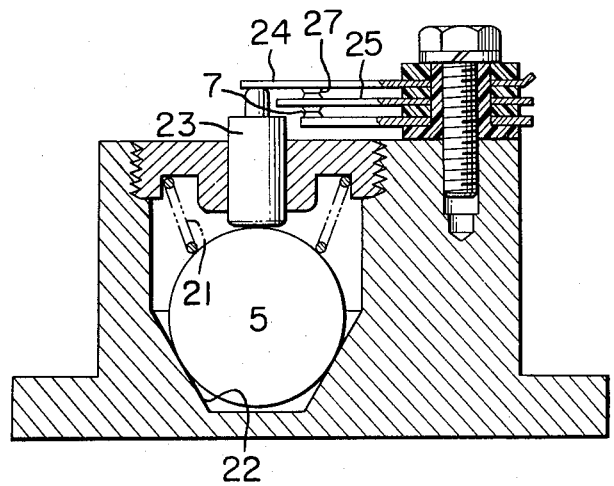
FIG. 9 is a vertical cross-sectional view illustrating one example of the operating mechanism of the mechanical G-sensor switch.

FIG. 9 illustrates one form of switch structure including contacts 7 and 27 shown in FIGS. 7 and 8. The sensor weight 5 is moved upward along the inclined surface 22 against the bias of a spring 21 when accelerated sidewise or in an upward direction and in this manner acts to drive a pin 23 upwardly. As shown, the pin 23 is shouldered at its top and, when raised, acts first to push up a first contact leaf spring 24 to open the contacts 27 and then to push up a second contact leaf spring 25 to open the contacts 7.

As described above, the device of the present invention includes a first mechanical G-sensor switch and a second electrical G-sensor switch, both connected in series with an electromagnetic coil operable to lock the belt reel, the second switch being arranged to operate in advance of the first switch. Thus it can securely lock the safety belt under an acceleration in the order of 0.5 G without necessitating the use of any especially large G-sensor weight. Also, the contacts of the mechanical switch are not injured to any substantial extent since no arcing arises upon the opening of the switch contacts, which is effected only after the electrical switch has operated. Moreover, the device has an extremely high lifesaving capacity as the mechanical sensor switch is operable under a large acceleration as may occur in a collision to securely lock the safety belt even in the event of a failure of the electrical sensor switch to open the coil circuit.

In the above, an appropriate alarm circuit may be provided to detect failure of the electric switch 10 and the resulting operation of the mechanical switch 7 alone, thereby to prevent the driver from driving the vehicle for any extended time unaware of such trouble in the coil circuit.

Though some preferred embodiments of the present invention have been shown and described, it will be apparent to those skilled in the art that many changes and modifications may be made without departing from the spirit of the invention or from the scope of the appended claims.

What is claimed is:

1. A control device for an emergency lock type vehicle safety belt, comprising a belt retractor, means operable to lock said belt retractor, a mechanical G-sensor switch, and an electrical G-sensor switch both connected in series with said means to control the same, said second G-sensor switch being so constructed and arranged as to operate in advance of said first G-sensor switch in response to forces applied to said vehicle whereby arcing at the mechanical switch is substantially avoided.

2. A control device as claimed in claim 1 wherein said means is an electromagnetic means operable to prevent movement of said belt retractor.

3. A control device as claimed in claim 2 wherein said vehicle includes a source of electrical power and an ignition switch coupled thereto, said mechanical and electrical switches being connected in series with said means and said ignition switch.

4. A control device as claimed in claim 3 comprising a manually operable pushbuttom switch connected across the mechanical and electrical switches for selectively shorting the same.

5. A control device as claimed in claim 3 wherein said mechanical switch includes contacts and spring loaded weight means adapted to bridge said contacts.

6. A control device as claimed in claim 5 wherein said contacts are normally open and are closed by said weight means in response to forces applied to said vehicle.

7. A control device as claimed in claim 5 wherein said contacts are normally closed and are opened by said weight means responding to forces applied to said vehicle.

8. A control device as claimed in claim 3 comprising means coupling said mechanical switch to said electrical switch and generating a signal in response to said mechanical switch to actuate said electrical switch.

9. A control device as claimed in claim 3 comprising G-sensitive means separate from the mechanical switch and coupled to and actuating said electrical switch.

10. A control device as claimed in claim 3 comprising means for directly coupling said mechanical switch to said source and thereby shunting said electrical switch.

11. A control device as claimed in claim 3 wherein said electrical switch includes a strain gauge, a dummy load connected at a junction to said strain gauge, an amplifier coupled to said junction, delay means coupled to said amplifier, a diode shunting at least part of said delay means, and an electronic switch coupled to said delay means.

12. A control device as claimed in claim 5 wherein said contacts include two pairs of contacts one of which is in series with said electrical switch and the other of which is in series with the first said means, the pairs of contacts being adapted to close in sequence.

13. A control device as claimed in claim 3 wherein said electrical switch comprises two intercoupled transistors, contacts, and electromagnetic means coupled to said transistors and adapted to bridge the latter said contacts.

14. A control device as claimed in claim 12 wherein said mechanical switch includes a casing provided with a receptacle, three leaf springs mounted in staggered parallel relation on said casing, a shouldered actuator pin extending displaceably out of said casing for sequentially engaging the leaf springs, a weight movable in said receptacle, and a spring yieldably restraining movement of said weight, said contacts being mounted on said leaf springs.

* * * * *